(12) United States Patent
Rodriguez

(10) Patent No.: US 8,918,790 B2
(45) Date of Patent: Dec. 23, 2014

(54) METHOD AND SYSTEM FOR APPLICATION PROFILING FOR PURPOSES OF DEFINING RESOURCE REQUIREMENTS

(75) Inventor: Peter P. Rodriguez, Pleasanton, CA (US)

(73) Assignee: International Business Machines Corporation, Armonk, NY (US)

(*) Notice: Subject to any disclaimer, the term of this patent is extended or adjusted under 35 U.S.C. 154(b) by 1262 days.

(21) Appl. No.: 12/126,123

(22) Filed: May 23, 2008

(65) Prior Publication Data

US 2008/0222288 A1 Sep. 11, 2008

Related U.S. Application Data

(63) Continuation of application No. 11/181,120, filed on Jul. 14, 2005, now Pat. No. 7,707,579.

(51) Int. Cl.
*G06F 9/46* (2006.01)
*G06F 9/455* (2006.01)
*G06F 15/173* (2006.01)
*H04L 29/08* (2006.01)
*G06F 9/50* (2006.01)

(52) U.S. Cl.
CPC .............. *H04L 67/16* (2013.01); *G06F 9/5072* (2013.01)
USPC ............... 718/104; 718/1; 718/105; 709/224; 709/226

(58) Field of Classification Search
None
See application file for complete search history.

(56) References Cited

U.S. PATENT DOCUMENTS

| | | | |
|---|---|---|---|
| 6,457,142 B1* | 9/2002 | Klemm et al. | 714/38.12 |
| 6,640,241 B1* | 10/2003 | Ozzie et al. | 709/204 |
| 6,779,016 B1 | 8/2004 | Aziz et al. | |
| 6,799,208 B1* | 9/2004 | Sankaranarayan et al. | 709/223 |
| 7,171,654 B2* | 1/2007 | Werme et al. | 717/130 |
| 7,243,267 B2* | 7/2007 | Klemm et al. | 714/38.11 |
| 7,793,290 B2* | 9/2010 | Gebhart et al. | 718/100 |
| 7,861,246 B2* | 12/2010 | Lu et al. | 718/102 |
| 2004/0019624 A1* | 1/2004 | Sukegawa | 709/201 |
| 2004/0044718 A1* | 3/2004 | Ferstl et al. | 709/200 |
| 2004/0068553 A1 | 4/2004 | Davis et al. | |
| 2004/0103195 A1 | 5/2004 | Chalasani et al. | |
| 2004/0123296 A1* | 6/2004 | Challenger et al. | 718/102 |
| 2004/0128384 A1* | 7/2004 | Rolia et al. | 709/226 |
| 2004/0139202 A1* | 7/2004 | Talwar et al. | 709/229 |
| 2004/0167980 A1 | 8/2004 | Doyle et al. | |
| 2004/0177249 A1 | 9/2004 | Keohane et al. | |
| 2004/0210627 A1 | 10/2004 | Kroening | |
| 2004/0268361 A1* | 12/2004 | Schaefer | 719/310 |

(Continued)

OTHER PUBLICATIONS

"Grid Services for Distributed System Integration", I. Foster, et al., Computer, 35(6), 2002.

*Primary Examiner* — Meng An
*Assistant Examiner* — Tammy Lee
(74) *Attorney, Agent, or Firm* — Scully, Scott, Murphy & Presser, P.C.; Jeff Tang, Esq.

(57) ABSTRACT

Disclosed are a method of and system for profiling a computer program. The method comprises the steps of using a utility application to execute the computer program; and on the basis of said execution of the computer program, identifying specific performance requirements of the computer program. A profile of the computer program is determined from said identified performance requirements; and based on said determined profile, resources for the computer program are selected from a grid of computer services.

19 Claims, 3 Drawing Sheets

(56) References Cited

U.S. PATENT DOCUMENTS

| | | | |
|---|---|---|---|
| 2005/0022185 A1* | 1/2005 | Romero | 718/100 |
| 2005/0027865 A1* | 2/2005 | Bozak et al. | 709/226 |
| 2005/0066033 A1* | 3/2005 | Cheston et al. | 709/225 |
| 2006/0064698 A1* | 3/2006 | Miller et al. | 718/104 |
| 2006/0130066 A1* | 6/2006 | Bozak et al. | 718/104 |
| 2006/0143525 A1* | 6/2006 | Kilian | 714/31 |
| 2006/0167939 A1* | 7/2006 | Seidman et al. | 707/104.1 |
| 2006/0195559 A1* | 8/2006 | Winter et al. | 709/223 |

* cited by examiner

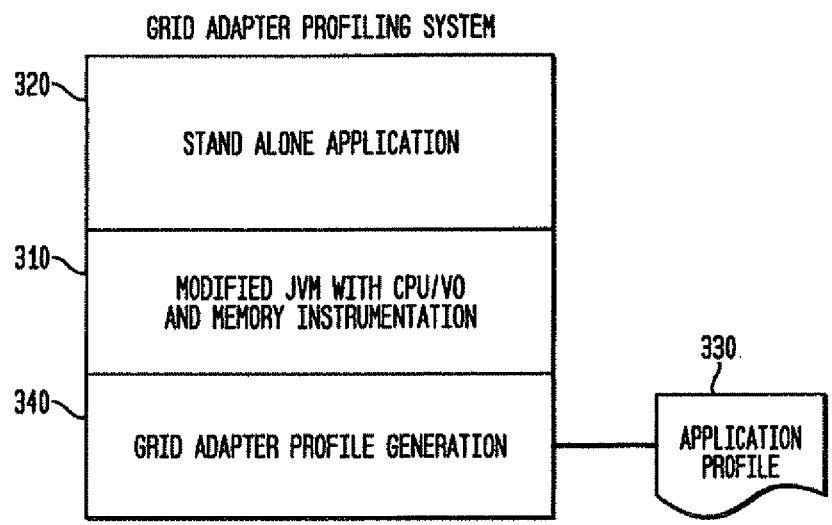
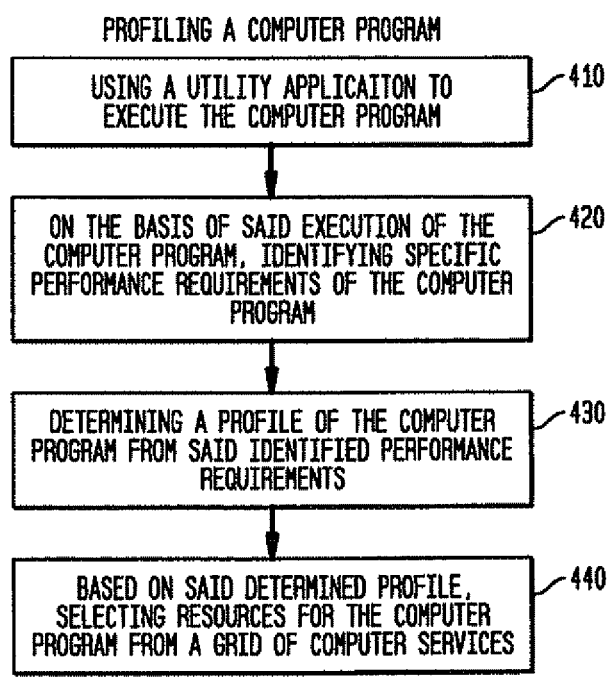

METHOD AND SYSTEM FOR APPLICATION PROFILING FOR PURPOSES OF DEFINING RESOURCE REQUIREMENTS

RELATED APPLICATION

The present application is a continuation-in-part application of U.S. Ser. No. 11/181,120, filed Jul. 14, 2005.

BACKGROUND OF THE INVENTION

1. Field of the Invention

This invention generally relates to computer networks, and more particularly, the invention relates to the use of decentralized, collaborative networks having a grid infrastructure. Even more specifically, the invention relates to methods, systems, computer program products, and methods of doing business wherein network-accessible services are provided in a decentralized network having a federated grid infrastructure.

2. Background Art

An emerging trend in information technology in general, and in decentralized networks of the type provided by network service providers, is use of collaboration. This trend is evidenced by the level of investment in so-called "web services" and in the adoption of a number of open industry standards supporting web services. In general, the term "web service" refers to an interface that describes a collection of network-accessible operations. Web services technology is a mechanism for distributed application integration, and is also commonly refereed to as the "service-oriented architecture" for distributed computing. Web services fulfill a specific task or a set of tasks. They may work with one or more other web services in an interoperable manner to carry out their part of a complex workflow or a business transaction. For example, completing a complex purchase order transaction may require automated interaction between an order placement service (i.e., order placement software) at the ordering business and an order fulfillment service at one or more of its business partners. In turn, this order fulfillment service may interact with a credit card approval service, a package delivery service, and so forth.

With increased use of collaborative networking, efficient techniques for resource sharing will become critical. Resource sharing is complicated in conventional distributed or decentralized networks by the heterogeneity that exists when using technologies such as web services. In recent years, the academic and scientific communities cooperated to develop the concept of "grid technology" for sharing their resources. A "grid" may be defined as a collection of distributed computing resources available over a local or wide area network that appear to an end user or application as one large virtual computing system. A primary objective of grid computing is to create virtual dynamic organizations through secure, coordinated resource-sharing among individuals, institutions and resources. Grid computing is an approach to distributed computing that spans not only locations but also organizations, machine architectures and soft-ware boundaries to provide unlimited power, collaboration and information access to everyone connected to a grid.

Grid technology allows enterprises to share resources as they form "virtual organizations"—that is, the enterprises share their resources and services (which may be in geographically-widespread locations and which may have heterogeneous computing platforms) to form virtual computing services. (See "Grid Services for Distributed System Integration", I. Foster, et al., Computer, 35(6), 2002, for more information about grid technology.

Today an architecture referred to as "Open Grid Services" is being developed by academic and scientific communities, along with commercial entities such as International Business Machines Corporation ("IBM®"), as an evolution of grid technology. This Open Grid Services architecture ("OGSA") enables a grid to provide enterprises with an extensible set of services that can be aggregated by the virtual organizations. According to OGSA, all computational resources, storage resources, networks, programs, databases, and so forth are modeled as services, providing a service-oriented view. OGSA leverages web services technology (and the open industry standards on which that technology is built) as well as grid technology.

The OGSA work effort includes an evolution of a programmer's toolkit referred to a "Globus Toolkit", which is designed to make creation of grid-based applications easier. The Globus Toolkit defines a "grid runtime" as a set of services. This set of services includes: (1) a Grid Resource Allocation and Management ("GRAM") protocol and "gatekeeper" service, designed to provide secure, reliable service creation and management; (2) a Monitoring and Discovery Service ("MDS-2") for information discovery; and (3) a Grid Security Infrastructure for single sign-on, delegation, and credential mapping.

The need to be able to adapt current running applications to make use of the grid base system would be a key to getting to quick acceptance of GRID technology. The attractiveness of not having to re-design or recode any application, to realize the distributed grid resources represents a significant reduction in the cost to move to a GRID based infrastructure.

SUMMARY OF THE INVENTION

An object of this invention is to adapt current, running computer applications to make use of the grid based computer network system.

Another object of the invention is to enable currently running applications to realize the distributed grid resources without having to re-design or re-code those applications.

A further object of the present invention is to profile a computer application for purposes of defining resource requirements in relation to grid adapters for adapting the application to a grid based computer network system.

These and other objectives are attained with a method of and system for profiling a computer program. The method comprises the steps of using a utility application to execute the computer program; and on the basis of said execution of the computer program, identifying specific performance requirements of the computer program. A profile of the computer program is determined from said identified performance requirements; and based on said determined profile, resources for the computer program are selected from a grid of computer services.

The preferred embodiment of the invention provides a wrapper that, for example, may take the place of the Java Virtual Machine (JVM) or C++ library. The wrapper may be introduced to the application in place of its current JVM or C++ runtime library, and essentially take the place of it. The purpose of this wrapper is to provide pass-through access to the JVM, and at the same time enable monitoring during normal processing to determine the "cpersonality" of the application. Specifically, the need here is to understand the use of grid capable resources that any given application would/could utilize. To effectively move a standard J2SE or J2EE application to the distributed GRID system, one would need to be cognizant of the way a given application makes use of the primary resources. Those resources include: Processor, Internal I/O (disk), Memory, and External I/O (Network). Without this understanding—it would be possible to simply retro-fit the application, however, it would likely not perform better, or even as well on the GRID system, because blindly externalizing these resources is not necessarily the best approach. The system must understand at a fairly granular level, the usage patterns of the resources. The profiling wrapper's job then is to insert itself between the application and the JVM, and to monitor and record the usage characteristics of the application.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 3 schematically depicts a grid adapter profiling system embodying this invention.

FIG. 4 shows a procedure that may be used to profile an application.

DETAILED DESCRIPTION OF THE PREFERRED EMBODIMENTS

Before discussing the techniques of preferred embodiments in more detail, a brief description of grid services and how virtual organizations may be structure using a grid service infrastructure will be provided, referring to FIGS. 1 and 2A-2C.

Figure 1:
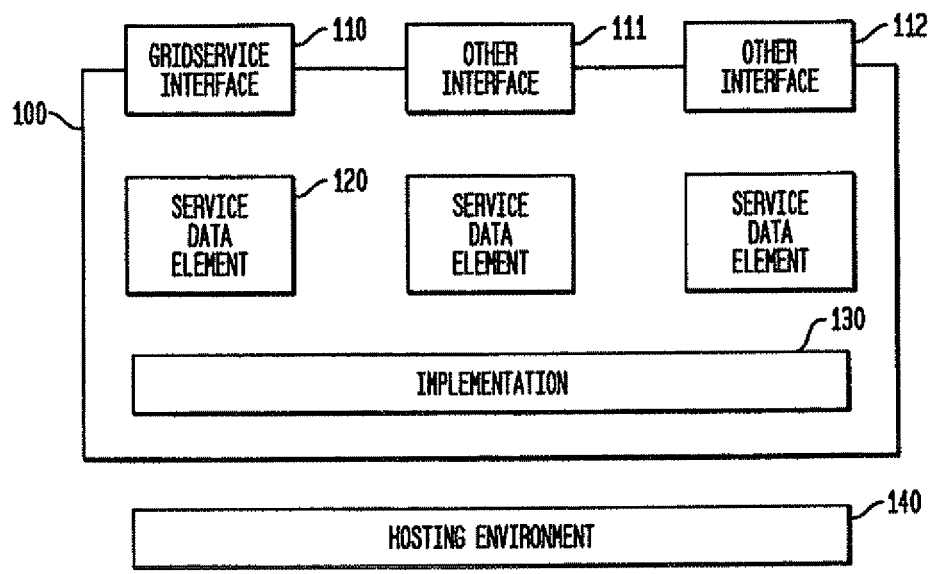
FIG. 1 illustrates a grid service according to the OSGA of the prior art.

FIG. 1 depicts a grid service 100, according to the OGSA of the prior art. A particular grid service may be offered by one or more hosting services, and each of these hosting services may provide one or more grid services. "Grid service" refers to a web service that is augmented with an additional interface, in order to be compliant with OGSA, and that follows certain conventions. According to the Grid Service Specification, a grid service is a Web Service Description Language (WSDL)—defined service that conforms to a set of conventions relating to its interface definitions and behaviors". (See Section 4, "The Grid Service", in the GSS.) According to OGSA, each grid service must implement the GridService interface 110, as shown in FIG. 1. This GridService interface includes functions for querying the GridService instance, setting its lifetime, and explicitly destroying the instance.

Additional interfaces specified in OGSA are optional, as shown at 111, 112. These optional interfaces may comprise one or more service-specific, interfaces, and/or one or more of the OGSA interfaces. The OGSA interfaces (some of which remain to be defined) include a Factory interface for dynamic creation of grid service instances; notification functions that enable service instances to communicate with one another asynchronously; a Registry interface for registering instance handles; a Mapping interface for locating a grid service instance by its handle; an authorization interface; a policy management interface; and a manageability interface providing functions for monitoring and managing grid service instances. A WSDL portType is preferably used to specify the service interfaces of each grid service, and the collection of portTypes that each grid service supports is preferably specified using a serviceType element (The serviceType element is an extension to WSDL that is defined for use with grid services.)

One or more service data elements 120 are provided for each grid service. A service data element is a named, typed XML element encapsulated in a container. The service data elements for a particular grid service instance each provides service data for that instance, and has a unique name, a type, and a time-to-live (to be used for lifetime management). The information in the service data element allows requesters to find information about the grid service instance, including dynamically-created information (using introspective techniques, for example), and also allows the instance to be managed. (The "FindServiceData" operation of the GridService interface may be used to query a service data element.)

Each grid service may be provided by one or more implementations 130. Some implementations may be local to the environment in which the requester is operating, while others may be remotely located. The WSDL specification for the grid service allows requesters to access an implementation transparently (e.g., without regard to the programming language in which the service is implemented or the location of the service instance). A grid service can be hosted by one or more hosting environments 140 (which may alternatively be referred to as "execution environments"). The hosting environment determines the programming model, programming language, development and debugging tools that are available, and so forth. For example, an implementation of a grid service might be written as a procedure-oriented program using the "C" programming language and execute on a particular operating system platform, and another implementation of this same grid service might be written as an object-oriented program on the Java™ programming language and execute on the WebSphere® platform from IBM. These concepts are known in the art, and will not be described in detail herein, ("Java" is a trademark of Sun Microsystems, Inc., and "WebSphere" is a registered trademark of IBM.)

Figure 2A:
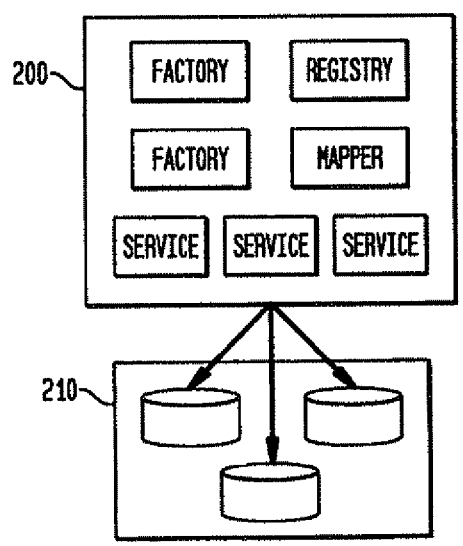
FIGS. 2A-2C show how virtual organizations may be structured using a grid service infrastructure according to the prior art.
Figure 2C:
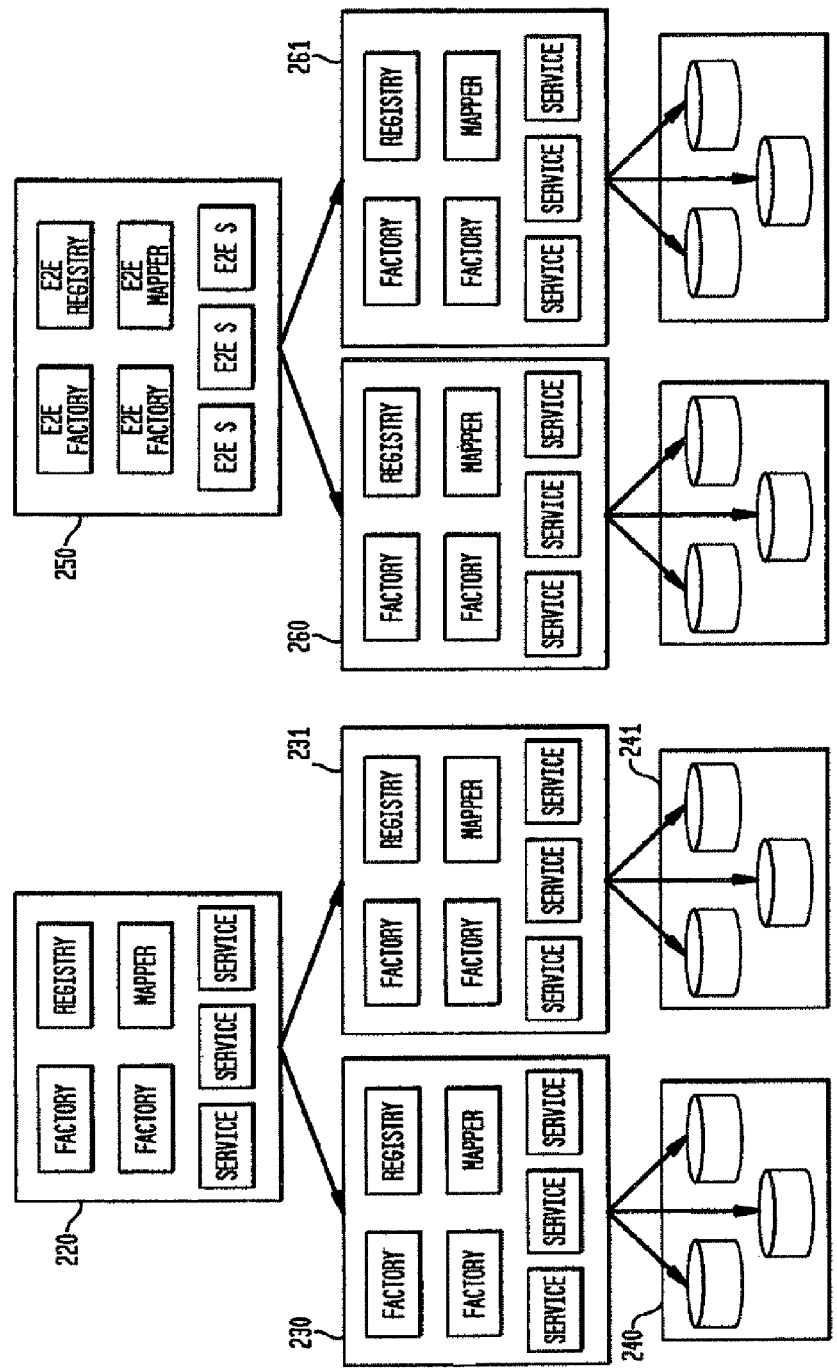
Figure 2B:
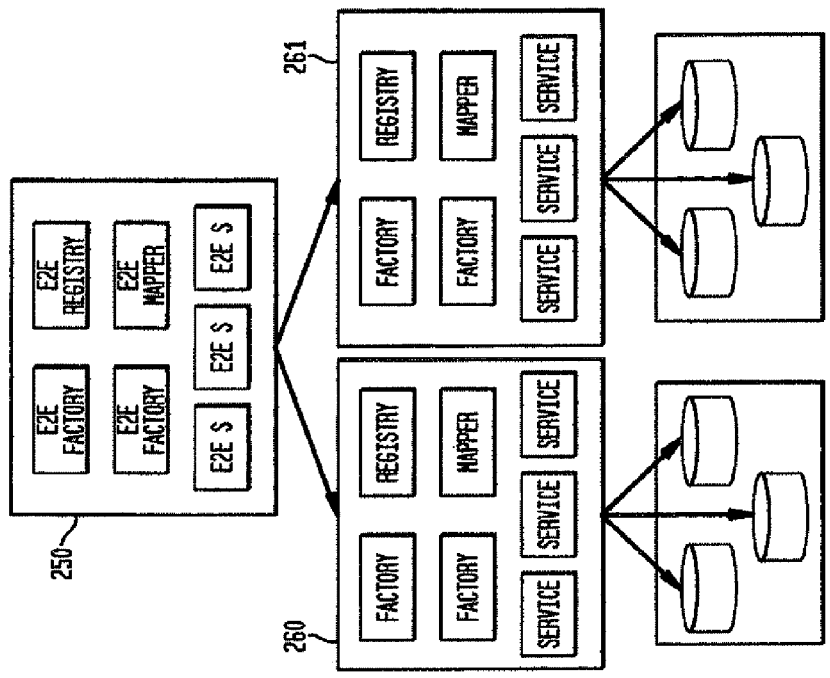

FIG. 2A illustrates how a simple hosting environment may be structured, where the resources 210 of a grid service 200 are located within the grid service's local network domain. (The resources in FIGS. 2A-2C are shown as storage resources, although this is by way of example only.) This simple hosting environment comprises one or more factory instance (which may be used to create new grid services, as stated above), a registry of the available factories, and a mapper (used to locate a particular grid service instance given its globally-unique handle or identifier.

FIG. 2B shows a virtual hosting environment structure, where (for this example) two sets of resources 240, 241 are located within distinct network domains. The virtual organization ("VO") still provides an interface 220 as in FIG. 2A, comprising one or more factory instances, a registry of the available factories, and a mapper. Behind this VO interface 220 may be a collection of simple hosting environment interfaces of the type shown in FIG. 2A. In this example, two simple hosting environment interfaces 230, 231 provide accessibility to their resources 240, 241.

As with web services, the behaviors of one or more grid services may be aggregated to compose another grid service. This is illustrated by the interface to "end-to-end" grid service 250 in FIG. 2C, where the factory interface is now designated as an "end-to-end" ("E2E") factory, the services are "end-to-end" services ("E2E S"), and so forth. The E2E factory instances in this case create new instances of the end-to-end or aggregated grid service, and the E2E registry instance tracks and advertises those E2E factory instances. The E2E factory instances preferably interact with lower-level factory instances (for example, from grid service 260 and/or 261), asking those lower-level factories to create service instances that can then be aggregated to create the end-to-end grid service 250. (An end-to-end grid service may alternatively be referred to as a "collective" or "virtual" grid service.)

As demonstrated by FIGS. 2A-2C, a client can access a grid service and its resources in an identical manner, where the grid service interface is identical regardless of which hosting environment has been used to provide that grid service and those resources.

As mentioned above, the need to be able to adapt current, running applications to make use of the grid base system would be a key to getting to quick acceptance of GRID technology. The attractiveness of not having to re-design or recode any application, to realize the distributed grid resources represents a significant reduction in the cost to move to a GRID based infrastructure.

With reference to FIG. 3, the preferred embodiment of the invention provides a wrapper 310 that, for example, may take the place of the Java Virtual Machine (JVM) or C++ library. The wrapper may be introduced to the application 320 in place of its current JVM or C++ runtime library, and essentially take the place of it. The purpose of this wrapper is to provide pass-though access to the JVM, and at the same time enable monitoring during normal processing to determine the application profile 330, or "personality", of the application. Specifically, the need here is to understand the use of grid capable resources that any given application would/could utilize. To effectively move a standard J2SE or J2EE application to the distributed GRID system, one would need to be cognizant of the way a given application makes use of the primary resources. Those resources include: Processor, Internal I/O (disk), Memory, and External I/O (Network). Without this understanding it would be possible to simply retro-fit the application, however, it would likely not perform better, or even as well on the GRID system, because blindly externalizing these resources is not necessarily the best approach. The system must understand at a fairly granular level, the usage patterns of the resources. The profiling wrapper's job then is to insert itself between the application and the JVM, and to monitor and record the usage characteristics of the application.

In reality the wrapper might be a basic java pass-through application, with the ability to enable hooks in the various services that we are concerned with in order to profile the application. Alternatively, if one has access to the source code of a given application, the effort could be to actually instrument the source code itself with these monitoring hooks, and recompiled. The profiling system is envisioned to make use of both or either methods to gain intelligence about the application. The output data from the wrapper would record the personality of the application. To do this, the profiler would monitor an application for a reasonable period of time in order to understand the application as it performs its normal duties.

Several scenarios are documented below that could result from a number of profiling efforts. In the end, there will be decisions and trade-offs that must be made—either manually or automatically—to determine the appropriate services to virtualize on the GRID. For example, if the application happens to be very network intensive, but uses little other resources, it would likely be best to virtualize the entire application to essentially run complete copies across the grid. On the other hand, if an application is encountered that requires excessive disk I/O, or excessive memory use; it may be preferred to only virtualize those supporting services that are not in critical speed requirements for the application to properly function. If speed is not of the essence, but massive scalability is, it may make more sense to virtualize it all, across multiple instance, thus providing the entire cumulative resources across the GRID, it all depends on the application, its business case usage needs, etc.

To effectively make use of the GRID using GRID adapters, applications preferably meet two criteria. 1) They have an associated configuration file (profile) that provides critical application specific data needed to effectively execute the application in the new environment in the best possible way. 2) Applications conform to the standard Java API, or C++ API. Thus, any program (server or client) that is written and deployed using the Java or C++ base libraries, is an instant candidate to use GRID adapters.

The XML (Application) Profile

The application profile is anticipated as an XML format file that accurately describes the functions of an application to the GRID adapter, and the relative priority within the over all system. With reference to FIGS. 3 and 4, to configure an application, a utility 340 resembling a "Wizard" can be run, as a shell, which, as represented at step 410, executes the Program in a testing environment. From this, the system can, as represented at step 420, automatically discover specific performance requirements such as memory allocation requirements, I/O intensiveness, network usage, CPU, Math operations and so forth. From this test execution, the profiling tool (wizard) can, as represented at step 430, build most of the Application configuration file. This configuration file, as represented at step 440, can be used to select resources for the application from a grid of computer services. In cases where constant logging is occurring (excessive disk I/O), those functions can be allocated to only occur on the local system. If large amounts of storage or CPU intensive activities are required, the resources are requested via the GRID resources and this too is preferably configured in the profile.

Once the general aspects of the application are discovered and recorded, the parameters selected can be presented to the administrator with options to override any particular setting (along with the warning that if configured improperly, the overall system efficiency may be compromised). Finally the administrator defines a relative priority—by rating the application among various factors—such as timeliness of completion (from overnight to real time), criticalness of the application for the business, in terms of cost to the business if system fails to complete the run, frequency of execution, and relative importance to other registered applications It should be noted that the grid services concepts and syntax are undergoing revisions, and thus the operation names, parameter names, and so forth that are used herein to describe preferred embodiments might change during this revision process. Accordingly, the examples used herein are provided for purposes of illustration and not of limitation; alternative messages, operations, interfaces, formats, syntax, and so forth may be used without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product, which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of profiling and selecting grid resources for a computer program to adapt the computer program to use a specified grid based system of computer services via a grid adapter, the method comprising the steps of:
   using a utility application to execute the computer program on a virtual machine running on a computer system;
   inserting a wrapper between the utility application and the virtual machine;
   said wrapper providing access to the virtual machine, monitoring operation of the computer program for a period of time, and recording resource use characteristics and patterns of the operation of the computer program to understand the use of grid capable resources that the computer program could utilize and to be cognizant of the way the computer program makes use of resources, including
   on the basis of said execution of the computer program, identifying specific performance requirements of the computer program, and
   determining a profile of the computer program from the recorded use characteristics and patterns and said identified performance requirements to adapt the computer program to the specified grid based system of computer services via the grid adapter, said profile describing a relative priority of the computer program to the grid adapter; wherein said relative priority is based on a timeliness of completion of the computer program, a criticalness of the computer program for a business, a frequency of execution of the computer program, and a relative importance of the computer program to other specified applications; and
   using said determined profile for selecting resources for the computer program from the grid based system of computer services.

2. A method according to claim 1, wherein said specific performance requirements are selected from the group including: memory allocation requirements, I/O intensiveness, network usage, CPU, and math operation.

3. A method according to claim 1, wherein the step of selecting resources includes the steps of:
   presenting the selection of resources to an administrator; and
   said administrator having an option to override any particular selection of resources.

4. A method according to claim 3, wherein the step of selecting resources includes the further step of said administrator defining a relative priority for the distribution of resources from the grid.

5. A method according to claim 1, wherein the step of using the utility application includes the step of using the utility application to build a configuration file for the computer program.

6. The method according to claim 1, wherein the step of determining a profile of the computer program includes using the wrapper to build a configuration file for the utility application.

7. The method according to claim 1, wherein said profile providing specific data needed to execute the computer program, in an environment of said grid based system, in a best possible way.

8. A system for profiling and selecting grid resources for a computer program to adapt the computer program to use a specified grid based system of computer services via a grid adapter, the system comprising:
   a computer device comprising a memory and at least one processor coupled to the memory and operative for:
   using a utility application to execute the computer program on a virtual machine running on a computer system;
   inserting a wrapper between the utility application and the virtual machine;
   said wrapper providing access to the virtual machine, monitoring operation of the computer program for a period of time, and recording resource use characteristics and patterns of the operation of the computer program to understand the use of the grid capable resources that the computer program could utilize and to be cognizant of the way the computer program makes use of resources, including
   on the basis of said execution of the computer program, identifying specific performance requirements of the computer program, and
   determining a profile of the computer program from the recorded use characteristics and patterns and said identified performance requirements to adapt the computer program to the specified grid based system of computer services via the grid adapter, said profile describing a relative priority of the computer program to the grid adapter; wherein said relative priority is based on a timeliness of completion of the computer program, a criticalness of the computer program for a business, a frequency of execution of the computer program, and a relative importance of the computer program to other specified applications; and using said determined profile for selecting resources for the computer program from the grid based system of computer services.

9. A system according to claim 8, wherein said specific performance requirements are selected from the group including: memory allocation requirements, I/O intensiveness, network usage, CPU, and math operation.

10. A system according to claim 8, wherein the selecting resources includes:
presenting the selection of resources to an administrator; and
providing said administrator with an option to override any particular selection of resources.

11. A system according to claim 10, wherein the selecting resources further includes enabling said administrator to define a relative priority for the distribution of resources from the grid.

12. A system according to claim 8, wherein the using the utility application includes using the utility application to build a configuration file for the computer program.

13. A system according to claim 8, wherein the computer program has an associated configuration file that provides application specific data needed to execute the utility application using services from the grid.

14. A program storage hardware device readable by machine, tangibly embodying a program of instructions executable by the machine to perform method steps for profiling a computer program to adapt the computer program to use a specified grid based system of computer services via a grid adapter, said method steps comprising:
using a utility application to execute the computer program on a virtual machine running on a computer system;
inserting a wrapper between the utility application and the virtual machine; said wrapper providing access to the virtual machine, monitoring operation of the computer program for a period of time, and recording resource use characteristics and patterns of the operation of the computer program to understand the use of grid capable resources that the utility application could utilize and to be cognizant of the way the computer program makes use of resources, including
on the basis of said execution of the computer program, identifying specific performance requirements of the computer program, and
determining a profile of the computer program from the recorded use characteristics and patterns and said identified performance requirements to adapt the computer program to the specified grid based system of computer services via the grid adapter, said profile describing a relative priority of the computer program to the grid adapter; wherein said relative priority is based on a timeliness of completion of the computer program, a criticalness of the computer program for a business, a frequency of execution of the computer program, and a relative importance of the computer program to other specified applications; and
using said determined profile for selecting resources for the computer program from the grid based system of computer services.

15. A program storage device according to claim 14, wherein said specific performance requirements are selected from the group including: memory allocation requirements, I/O intensiveness, network usage, CPU, and math operation.

16. A program storage device according to claim 14, wherein the step of selecting resources includes the steps of:
presenting the selection of resources to an administrator; and
said administrator having an option to override any particular selection of resources.

17. A program storage device according to claim 16, wherein the step of selecting resources includes the further step of said administrator defining a relative priority for the distribution of resources from the grid.

18. A program storage device according to claim 14, wherein the step of using the utility application includes the step of using the utility application to build a configuration file for the computer program.

19. A method of profiling and selecting grid resources for a computer program to adapt the computer program to use a specified grid based system of computer services via a grid adapter, the method comprising the steps of:
using a utility application to execute the computer program on a virtual machine running on a computer system;
inserting a wrapper between the utility application and the virtual machine;
said wrapper providing access to the virtual machine, monitoring operation of the computer program for a period of time, and recording resource use characteristics and patterns of the operation of the computer program to understand the use of grid capable resources that the utility application could utilize, including
on the basis of said execution of the computer program, identifying specific performance requirements of the computer program, and
determining a profile of the computer program from the recorded use characteristics and patterns and said identified performance requirements to adapt the computer program to the specified grid based system of computer services via the grid adapter, said profile describing a relative priority of the computer program to the grid adapter; and
based on said determined profile, selecting resources for the computer program from the grid based system of computer services; and wherein
the determining the profile includes the wrapper enabling hooks in a plurality of services to profile the computer program;
the profile describes a plurality of functions of the computer program; and
said relative priority is based on a timeliness of completion of the computer program, a criticalness of the computer program for a business, a frequency of execution of the computer program, and a relative importance to other specified applications.

* * * * *